Nov. 28, 1967  C. L. CUMMINS, JR  3,355,108
CHECK VALVE CARTRIDGE ASSEMBLY
Filed Oct. 21, 1965
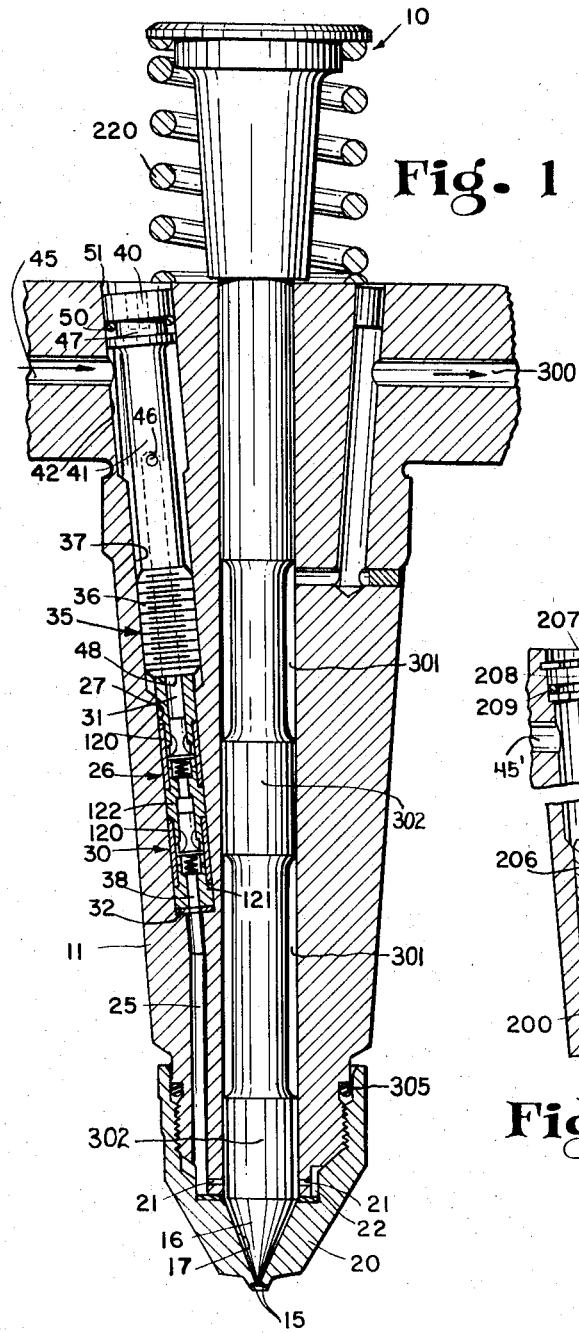
Fig. 1
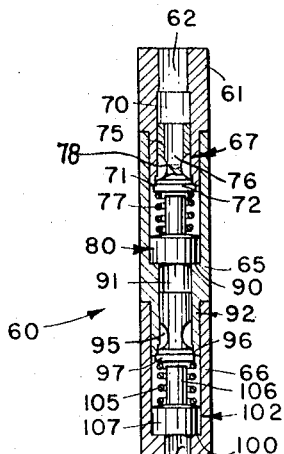
Fig. 2
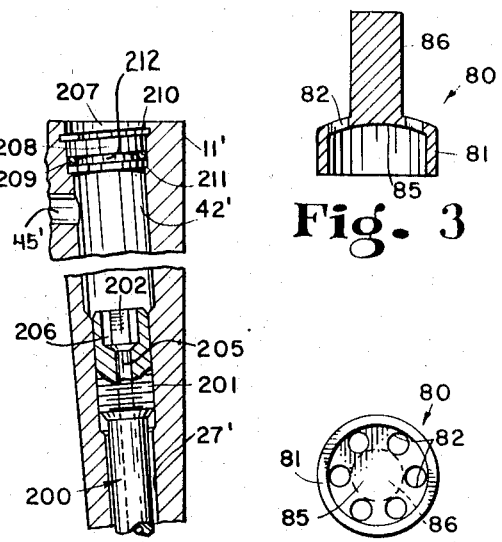
Fig. 5   Fig. 4
Fig. 3
INVENTOR.
CLESSIE L. CUMMINS, JR.
BY
Lockwood, Woodard, Smith & Weikart
ATTORNEYS

United States Patent Office 3,355,108
Patented Nov. 28, 1967

3,355,108
CHECK VALVE CARTRIDGE ASSEMBLY
Clessie L. Cummins, Jr., Indianapolis, Ind., assignor to The Buehler Corporation, Indianapolis, Ind., a corporation of Indiana
Filed Oct. 21, 1965, Ser. No. 499,986
9 Claims. (Cl. 239—90)

ABSTRACT OF THE DISCLOSURE

A check valve cartridge assembly including a pair of check valves within the cartridge for controlling flow through a passage which extends through the cartridge. The cartridge is received within a fuel passage which leads to a fuel injection plunger. The cartridge is held in position in the fuel passage by an externally threaded plug which has an internal passage through which fuel flows.

---

The present invention relates to improvement in fuel injectors used in compression ignition internal combustion engines and to certain subcombinations thereof.

The fuel injector disclosed in Patent No. 3,131,866 of which I am one of the joint inventors, incorporates a number of improvements which make it particularly efficient as a fuel injector. However, the injector of Patent 3,131,866 requires that the travel of one of the check valves in the fuel passage leading to the injector cup is dependent on the length and shape of the bore in the injector body in addition to the length and shape of the check valve retainer parts inserted in said bore. This increases the complexity and cost of manufacture of the injector. Also assembly and disassembly of the check valves 14 and 20 and associated structure is difficult and time consuming. Consequently, a primary object of this invention is to provide in a fuel injector an improved check valve arrangement.

Further objects of this invention are to provide a check valve arrangement which is easily assembled in its housing and easily disassembled from its housing and to provide a check valve arrangement in which the travel or stroke of the check valves can be more accurately set and maintained.

Still another object of the invention is to provide a fuel injector from which the check valves can be removed without removal of the fuel injector from the engine cylinder head.

Related objects and advantages will become apparent as the description proceeds.

One embodiment of the present invention might include a check valve assembly mounted within a counterbore forming a part of a fuel passage in the housing of a liquid fuel injection nozzle. The check valve assembly has a pair of check valves mounted on and contained within a preassembled cylindrical cartridge which is seated within the counterbore. There is also provided means for holding the cartridge in abutment with the shoulder of the counterbore.

The full nature of the invention will be understood from the accompanying drawings and the following description and claims.

FIG. 1 is a cross sectional view of an injector embodying the present invention.

FIG. 2 is an enlarged section similar to FIG. 1 of a portion of an alternative preferred embodiment of the present invention.

FIG. 3 is a side view of a stop member forming a part of the structure of FIGS. 1 and 2.

FIG. 4 is a bottom plan view of the structure of FIG. 3.

FIG. 5 is a fragmentary section similar to FIG. 1 of a portion of a further embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, there is illustrated a fuel injector which is in many respects similar or identical to the fuel injector shown in the above mentioned patent. Thus the fuel injector of FIG. 1 includes a plunger 10 which is driven downwardly in the housing 11 by means of a cam (not shown) to force fuel out of orifices 15 into the combustion chamber (not shown). The fuel is forced from a chamber defined by the conical lower tip 16 of the plunger 10 and by the mating inside conical surface 17 of an injector cup 20. The fuel is pumped into this chamber through radially inwardly extending ports 21 which lead into the chamber from an annular passage 22 communicating with a fuel passage 25.

Fuel is delivered to the passage 25 through the check valve assembly 26 which is received in the counterbore 27. The check valve assembly 26 includes a cartridge 30 of cylindrical configuration which has a passage 31 extending therethrough.

The cartridge 30 is retained against a resilient gasket member 32 by means of a plug 35. The plug 35 has an innermost externally threaded portion 36 which is threaded into a slightly enlarged portion 37 of the counterbore 27. The threaded portion 36 of the plug 35 bears against the cartridge 30 and holds it tightly against the gasket or washer 32 with the lower end portion 38 of the passage 31 in registry with the passage 25.

The plug 35 also includes an outer enlarged portion 40 and a reduced diameter central portion 41. The counterbore 37 is further enlarged at 42 and has a fuel passage 45 opening into the counterbore in the area 42. Communication between the fuel passage 45 and the passage 31 in the check valve assembly is provided through the enlarged portion 42 of the counterbore and through a passage 46 which extends radially inwardly in the plug 35 at the reduced diameter portion thereof and from the enlarged portion 42 of the counterbore thence axially in the plug 35 to the innermost or lowermost end 48 of the plug where the passage 46 leads into the passage 31. The plug 35 has an annular recess 47 therein which receives an O-ring 50. The O-ring 50 blocks flow of fuel from the mouth 51 of the counterbore 27.

Since FIG. 2 shows in enlarged form a preferred embodiment of the check valve assembly, the construction thereof will be described prior to the construction of the check valve assembly 26. The check valve assembly 60 of FIG. 2 is interchangeable with the check valve assembly 26 and can be used in connection with the remaining structure of FIG. 1 if desired. The check valve assembly 60 includes a first retainer 61 having an axial passage 62 therethrough and a second retainer 65 having the first retainer 61 telescoped therein. The cartridge 60 further includes a sleeve 66 having the retainer 65 telescoped therein. The retainer 61 slidably receives the valve 67 in the portion 70 of the passage 62, said portion 70 terminating at a valve seat 71 with which the head 72 of the valve 67 is adapted to co-operate.

The valve 67 includes a body portion 75 having an axially extending bore 76 communicating with a radially extending bore 78 so that fuel can flow through the passage 62 and the portion 70 thereof and through the body portion 75 of the valve. The valve 67 is normally yieldably retained with its head 72 in engagement with valve seat 71 by a coiled compression spring 77 acting between a spring stop member 80 and the head 72 of the valve 67. It is to be understood that the cartridge check valve assembly is not limited to the check valve configuration described above and shown in the drawings. For example, a spherical ball as a check valve may be incorporated in the cartridge assembly.

The stop member 80 is shown in more detail in FIGS. 3 and 4 and includes a cup portion 81 having a plurality of ports 82 therethrough and arranged in a circular pattern. Fixedly mounted upon the central portion 85 of the cup 81 is an abutment member 86 about which the coiled compression spring 77 is guided. The abutment member 86 determines the length of stroke of the check valve 67. As can be seen in FIG. 2, the cup portion 81 of the stop element 80 rests upon a shoulder 90 forming a part of a passage 91 extending through the retainer 65. The check valve 92 is shown identical to the check valve 67 and includes a passage 95 which functions in the same manner as the passage defined by bores 76 and 78 to permit flow of fuel past the check valve into the passage 91. The retainer 65 has a valve seat 96 which co-operates with the head 97 of the check valve 92 in identical manner to the head 72 and valve seat 71. However, the two check valves 92 and 67 need not be of identical construction. For example, one might be of the type shown and the other of the spherical ball type.

Received within the sleeve 66 against a shoulder 100 forming a part of a passage 101 through the sleeve is a stop element 102 identical to the stop element 80. A coiled compression spring 105 is received about the abutment member 106 and acts between the cup portion 107 and the head 97 of the check valve 92. The cartridge 60 is secured together in an integral relationship by epoxy glue between the two retainers and between the retainer 65 and the sleeve 66, although other means may be used for securing the cartridge together such as press fits.

Referring again to FIG. 1, the cartridge 30 is identical to the cartridge 60 with the exception that additional sleeves 120 are provided which are separate from the member 121 and retainer 122 instead of being formed integrally therewith as shown in FIG. 2. Also the stop elements 80 and 102 are replaced by shoulders on the members 121 and 122. In all other respects the cartridge 26 of FIG. 1 is identical to the cartridge 60 of FIG. 2.

Referring to FIG. 5, an alternative form of the invention is shown which includes a cartridge 200 identical to either of the above described cartridges. The housing 11' is identical to the above described housing 11 and has a passage 45' leading into the counterbored passage 27' and more particularly into enlarged portion 42' of the passage 27'. The cartridge 200 is tightly maintained against the washer corresponding to the washer 32 by means of an externally threaded member 201 having a passage 202 therethrough which is cylindrical at 205 and which has a socket configuration at 206 in order to receive a wrench for tightening down the member 201. The mouth 207 of the passage 27' is closed off by a plug 208 having an O-ring 209 received in a groove 212 in the external surface thereof. The plug 208 is retained in position by a snap ring 210 received in a suitable groove in the housing 11'. Fuel pressure holds the plug against the snap ring 210. A shoulder 211 prevents the plug from being inserted too far during assembly.

The fuel injector of this invention operates similarly to the fuel injector of said patent. Metered fuel from the fuel pump (not shown) is delivered into the chamber beneath the plunger 10 through the passage 45, the counterbore 27, the passage 25, the annular passage 22 and the radially extending passages 21. When the fuel is delivered into the chamber, the relatively weak springs 77 and 105 yield to permit the check valves 67 and 92 to open and pass the fuel to the chamber. While the chamber is being supplied with fuel, a spring 220 acting between the plunger 10 and the housing 11 maintains the plunger actuating mechanism against its cam and in turn the plunger in an upward position away from the cup 20 so that the fuel can flow into the chamber through the radial passages 21. The fuel is then forced through the nozzle orifices 15 into the combustion chamber by the cam (not shown) engaging the upper end of the plunger 10 and pushing it inwardly. Of course, the increased pressure of the fuel within the chamber causes it to tend to pass outwardly through the ports 21 up the passage 25. The two check valves, however, function to block flow of the fuel and combustion gases back up toward the passage 45.

For a description of the purpose and operation of passage 300 and the reduced diameter portions 301 and enlarged diameter portions 302 of plunger 10, reference is made to said patent. It should also be understood that the complete assembly includes a cylinder head as shown at 41 in said patent as well as the cam shown at 32 and the rocker lever shown at 33 in that patent. Referring to this specification, 305 in FIG. 1 designates an O-ring which seals the passage between the housing 11 and the cup 20.

It can be appreciated that the check valve cartridge of the present invention permits the travel of both the check valves to be accurately determined by the manufacturer by the dimensions of the check valve stops 80 and 102 and the lengths of the shoulders on the retainers and sleeves. It can also be appreciated that the cartridges 60 and 26 can be easily removed from the counterbore and replaced with a new cartridge by merely grasping the upper end of the respective cartridge and pulling it from the counterbore. This procedure is unlike that necessary in the case of the fuel injector of said patent since it is difficult to remove the lower check valve, stop and spring without turning the injector body upside down. Also the reassembly of paid patent's lower check valve and related parts preferably is made with the body 10 in an inverted position which is no longer necessary in the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. In a liquid fuel injection nozzle for the combustion chamber of an internal combustion engine, said nozzle comprising a housing having a liquid fuel passage therein connected to a fuel supply, said housing having a bore therein with a plunger chamber and seat at the inner end thereof and an orifice in said seat leading into said combustion chamber, a fuel injection plunger having a cylindrical inner end portion reciprocal in said bore adjacent said plunger chamber and having its innermost end portion adapted to mate with said seat at the end of the injection stroke of said plunger, said fuel passage leading into said plunger chamber; the improvement which comprises:

a check valve assembly including a cylindrical cartridge having a passage therethrough, a pair of check valves mounted on and contained within said cartridge and controlling flow through said cartridge passage, said housing having a counterbore therein which defines a portion of said fuel passage and receives said cylindrical cartridge, said counterbore defining with said fuel passage a shoulder, and means for holding said cartridge in abutment with said shoulder.

2. The arrangement of claim 1 wherein said cartridge includes a pair of retainers of annular configuration and each having a passage therethrough, each of said retainers having a valve seat at one end of its passage with each of said check valves engageable with a respective one of said valve seats, one of said retainers having its said one end telescoped within the other end of the other retainer, and a sleeve having the one end of the other retainer telescoped therein, said other retainer and said sleeve being fixed together and said retainers being fixed together.

3. The arrangement of claim 1 wherein said cartridge includes a pair of retainers of annular configuration and each having a passage therethrough, each of said retainers having a valve seat at one end of the passage of the respective retainer, said check valves each including a head and a body, the body of each check valve having a passage therethrough which opens through the wall of the body, each of said check valve bodies being slidable within a respective retainer passage with the respective check valve head extending from the one end of the passage and engageable with the respective valve seat, one of said retainers having its said one end telescoped within the other end of the other retainer, and a sleeve having the one end of the other retainer telescoped therein.

4. The arrangement of claim 1 wherein said holding means comprises a plug having one end portion which is externally threaded and a reduced diameter central portion, an O-ring surrounding said other end portion and engaging said housing to block flow out of said counterbore and housing, said plug being threaded into said counterbore and engaging said cartridge, a portion of said fuel passage leading into said counterbore externally of the reduced diameter portion of said plug, said plug having a passage leading from said cartridge through said one end portion and opening into said counterbore at said reduced diameter portion.

5. The arrangement of claim 1 wherein said cartridge includes a pair of retainers of annular configuration and each having a passage therethrough, each of said retainers having a valve seat at one end of the passage of said cartridge, said check valves each including a head and a body, the body of each check valve having a passage therethrough which opens through the wall of the body, each of said check valve bodies being slidable within a respective retainer passage with the respective check valve head extending from the one end of the passage and engageable with the respective valve seat, one of said retainers having its said one end telescoped within the other end of the other retainer, a sleeve having the one end of the other retainer telescoped therein, a pair of check valve stops each including a perforated cup and a stub shaft mounted centrally of said perforated cup, a pair of coiled compression springs each received on a respective one of said stub shafts, one of said stops and springs being received within the other end of the other retainer with said one spring engaging the head of one check valve and yieldably urging it into engagement with the seat of the one retainer, the other of said stops and springs being received within said sleeve with said other spring engaging the head of the other check valve and yieldably urging it into engagement with the seat of the other retainer, and glue securing said retainers together and said sleeve to said other retainer.

6. The arrangement of claim 1 wherein said holding means comprises an externally threaded member threaded into said counterbore into engagement with said cartridge, said member having an axial passage therethrough an outer portion of which is socketed to receive a tightening tool, a portion of said fuel passage leading into said counterbore outwardly of said member, and a plug received in said counterbore adjacent the mouth thereof, an O-ring surrounding said plug to seal said mouth, and a snap ring received in said counterbore to retain said plug therein.

7. A check valve assembly including a cylindrical cartridge having a passage therethrough, a pair of check valves mounted on and contained within said cartridge and controlling flow through said cartridge passage, said cartridge including a pair of retainers of annular configuration and each having a passage therethrough, each of said retainers having a valve seat at one end of the passage of the respective retainer, said check valves each including a head and a body, the body of each check valve having a passage therethrough which opens through the wall of the body, each of said check valve bodies being slidable within a respective retainer passage with the respective check valve head extending from the one end of the passage and engageable with the respective valve seat, one of said retainers having its said one end telescoped within the other end of the other retainer, and a sleeve having the one end of the other retainer telescoped therein.

8. A check valve assembly including a cylindrical cartridge having a passage therethrough, a pair of check valves mounted on and contained within said cartridge and controlling flow through said cartridge passage, said cartridge including a pair of retainers of annular configuration and each having a passage therethrough, each of said retainers having a valve seat at one end of the passage of said cartridge, said check valves each including a head and a body, the body of each check valve having a passage therethrough which opens through the wall of the body, each of said check valve bodies being slidable within a respective retainer passage with the respective check valve head extending from the one end of the passage and engageable with the respective valve seat, one of said retainers having its said one end telescoped within the other end of the other retainer, a sleeve having the one end of the other retainer telescoped therein, a pair of check valve stops each including a perforated cup and a stub shaft mounted centrally of said perforated cup, a pair of coiled compression springs each received on a respective one of said stub shafts, one of said stops and springs being received within the other end of the other retainer with said one spring engaging the head of one check valve and yieldably urging it into engagement with the seat of the one retainer, the other of said stops and springs being received within said sleeve with said other spring engaging the head of the other check valve and yieldably urging it into engagement with the seat of the other retainer, and glue securing said retainers together and said sleeve to said other retainer.

9. A check valve assembly comprising a cylindrical cartridge having a passage therethrough, a pair of check valves mounted on and contained within said cartridge and controlling flow through said cartridge passage, said cartridge including a pair of retainers of annular configuration and each having a passage therethrough, each of said retainers having a valve seat at one end of the passage of said cartridge, one of said retainers having its said one end telescoped within the other end of the other retainer, a sleeve having the one end of the other retainer telescoped therein, a pair of check valve stops each including a passage-providing portion and a stub shaft mounted centrally of said passage-providing portion, a pair of coiled compression springs each received on a respective one of said stub shafts, one of said stops and springs being received within the other end of the other retainer with said one spring engaging one of said check valves and yieldably urging it into engagement with the seat of the one retainer, the other of said stops and springs being received within said sleeve with said other spring engaging the other check valve and yieldably urging it into engagement with the seat of the other retainer, and glue securing said retainers together and said sleeve to said other retainer.

References Cited

UNITED STATES PATENTS

| 1,953,007 | 3/1934 | Farmer | 137—454.6 |
| 3,131,866 | 5/1964 | Cummins et al. | 239—584 |

EVERETT W. KIRBY, *Primary Examiner.*